United States Patent [19]

Hein

[11] Patent Number: 5,645,249

[45] Date of Patent: Jul. 8, 1997

[54] HELICOPTER STOWABLE HORIZONTAL STABILIZER

[75] Inventor: Jeff M. Hein, Fountain Hills, Ariz.

[73] Assignee: McDonnell Douglas Corporation, Huntington Beach, Calif.

[21] Appl. No.: 297,394

[22] Filed: Aug. 29, 1994

[51] Int. Cl.$^6$ .................................................. B64C 3/56
[52] U.S. Cl. ........................ 244/49; 244/17.11; 74/105
[58] Field of Search .............................. 244/49, 87, 2, 244/17.11, 17.19; 74/105

[56] References Cited

U.S. PATENT DOCUMENTS

| | | |
|---|---|---|
| 2,406,073 | 8/1946 | Griswold . |
| 2,538,602 | 1/1951 | Taylor . |
| 2,712,421 | 7/1955 | Naumann .......................... 244/49 |
| 3,427,824 | 2/1969 | Mayrath . |
| 4,245,801 | 1/1981 | Mulvey . |
| 4,424,723 | 1/1984 | Gockel . |
| 4,627,585 | 12/1986 | Einstein ............................ 244/2 |
| 4,778,129 | 10/1988 | Byford .............................. 244/49 |
| 5,271,652 | 12/1993 | Watanabe et al. ................ 74/105 |
| 5,379,969 | 1/1995 | Marx et al. ....................... 244/49 |

*Primary Examiner*—Andres Kashnikow
*Assistant Examiner*—Tien Dinh
*Attorney, Agent, or Firm*—Freilich Hornbaker Rosen

[57] ABSTRACT

An airfoil is provided for an aircraft such as a helicopter, wherein the airfoil can be folded to a stowed position and unfolded to an operational position, without requiring an adjustment of the control rod assembly which lies within the airfoil. The control rod assembly (50, FIG. 2) includes inboard and outboard control rods (60, 62) with adjacent ends lying below the main axis (86) about which the foldable airfoil parts pivot, with a linkage (64) connecting the control rods. The linkage includes a long first link (90, FIG. 5) pivotally connected at a first axis (92) to an end of the inboard control rod and a second link (96) pivotally connected at a second axis (102) to the first link and at a third axis (106) to the outboard control rod. The links are constructed so they overlap in the operational position of the horizontal stabilizer, with the first, second, and third axes lying substantially along a force line (70). A spring (130) urges the first link to pivot upwardly about the first axis to keep the three axes close to the force line in the flight position.

8 Claims, 5 Drawing Sheets

5,645,249

HELICOPTER STOWABLE HORIZONTAL STABILIZER

ORIGIN OF THE INVENTION

The invention described herein was made in the performance of work under U.S. Government Contract No. DAAJ09-89-C-A102 CCN: LNCAA017.

BACKGROUND OF THE INVENTION

It is often desirable to construct an aircraft airfoil so it can be folded for storage. Where a push-pull control rod assembly extends along the length of the airfoil, as to pivot a fin or other member, folding for stowage requires pivoting of parts of both the control rod assembly and the airfoil. The control rod assembly moves along a force line that lies above or below a main axis about which the airfoil parts pivot. The control rod assembly must be constructed to enable it to be folded about the main axis. One application for such folding airfoil and control rod assembly is for a helicopter horizontal stabilizer. It is desirable that the mechanism which connects the inboard and outboard control rods of the control rod assembly, be of relatively simple and lightweight construction, avoid "play" (lost motion) or looseness of the control rod assembly in the flight position, operate whether the control rod is positioned fully inboard or outboard, and be foldable and unfoldable without requiring an operator to handle or adjust the control rod assembly.

SUMMARY OF THE INVENTION

In accordance with one embodiment of the present invention, an aircraft folding airfoil apparatus is provided, of the type that includes a push-pull control rod assembly within the airfoil, wherein the control rod assembly is of relatively simple design, avoids the need for operator action to fold or unfold, avoids "play" in the control in the flight position, and which can fold and unfold in any operational position. The airfoil apparatus includes an airfoil with inboard and outboard airfoil parts that are pivotally connected about a main axis. The control rod assembly applies push-pull forces along a force line which is displaced from the main axis. The control rod assembly has inboard and outboard control rods with adjacent respective outer and inner ends, and a linkage which connects the inner end outer ends. The linkage includes first end second links that are pivotally connected to the adjacent control rod ends about first and third axes, with the links connected together about a second axis. The first, second, and third axes all lie substantially on the force line in the flight position.

The novel features of the invention are set forth with particularly in the appended claims. The invention will be best understood from the following description when read in conjunction with the accompanying drawings.

DESCRIPTION OF THE PREFERRED EMBODIMENT

Figure 1:
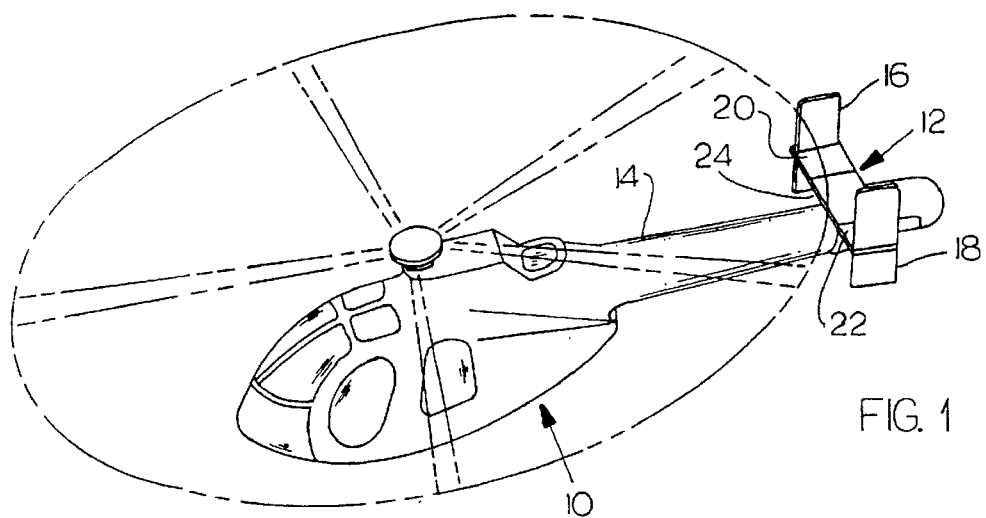
FIG. 1 is an isometric view of a helicopter constructed in accordance with the present invention, and having a horizontal stabilizer shown in the flight condition.
Figure 3:
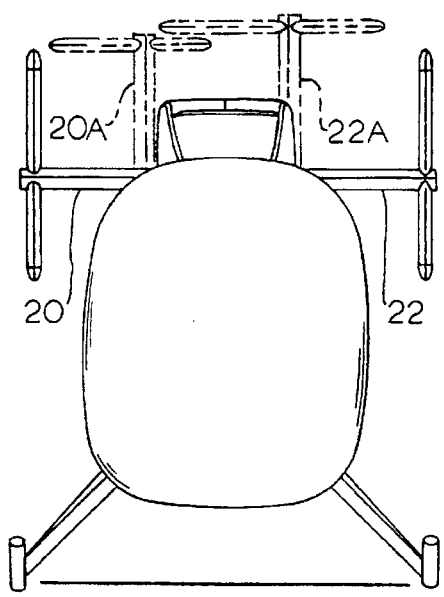
FIG. 3, is a front elevation view of the helicopter of FIG. 1, with the horizontal stabilizer shown in the flight condition in solid lines, and in the stowed position in phantom lines.
Figure 4:
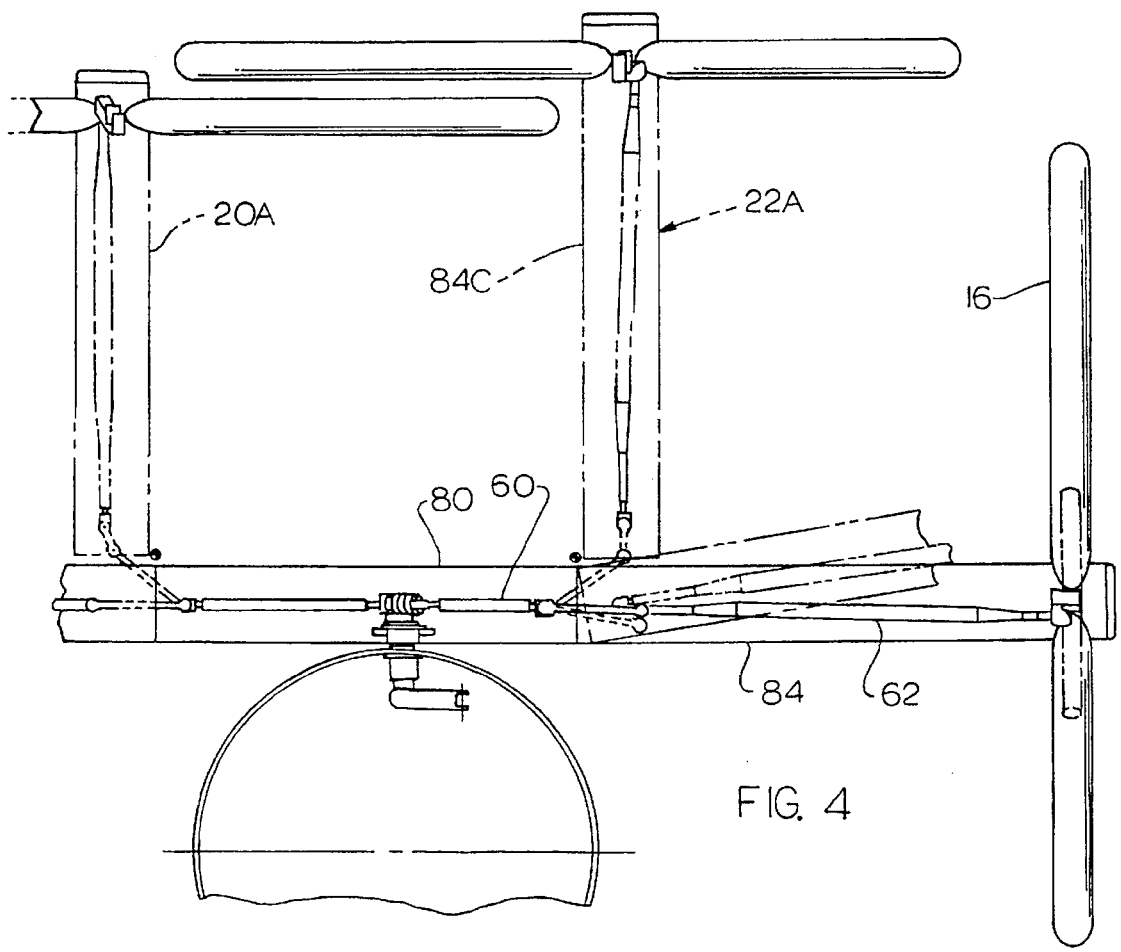
FIG. 4, is a rear view of the helicopter of FIG. 3, showing the horizontal stabilizer in the flight position, and showing, in phantom lines, the horizontal stabilizer in the stowed position.

FIG. 1 illustrates a helicopter type of aircraft 10 which has a horizontal stabilizer 12 near the rear of its tail boom 14. The horizontal stabilizer 12 carries largely vertical fins 16, 18 at its outboard ends. It is desirable to enable the horizontal stabilizer 12 to fold to a stowed position, wherein stabilizer outboard airfoil parts 20, 22 extend upwardly instead of horizontally from an inboard airfoil part 24. FIG. 3 shows the outboard airfoil parts in their operational or flight positions at 20, 22, and in their stowed positions at 20A, 22A.

Figure 2:
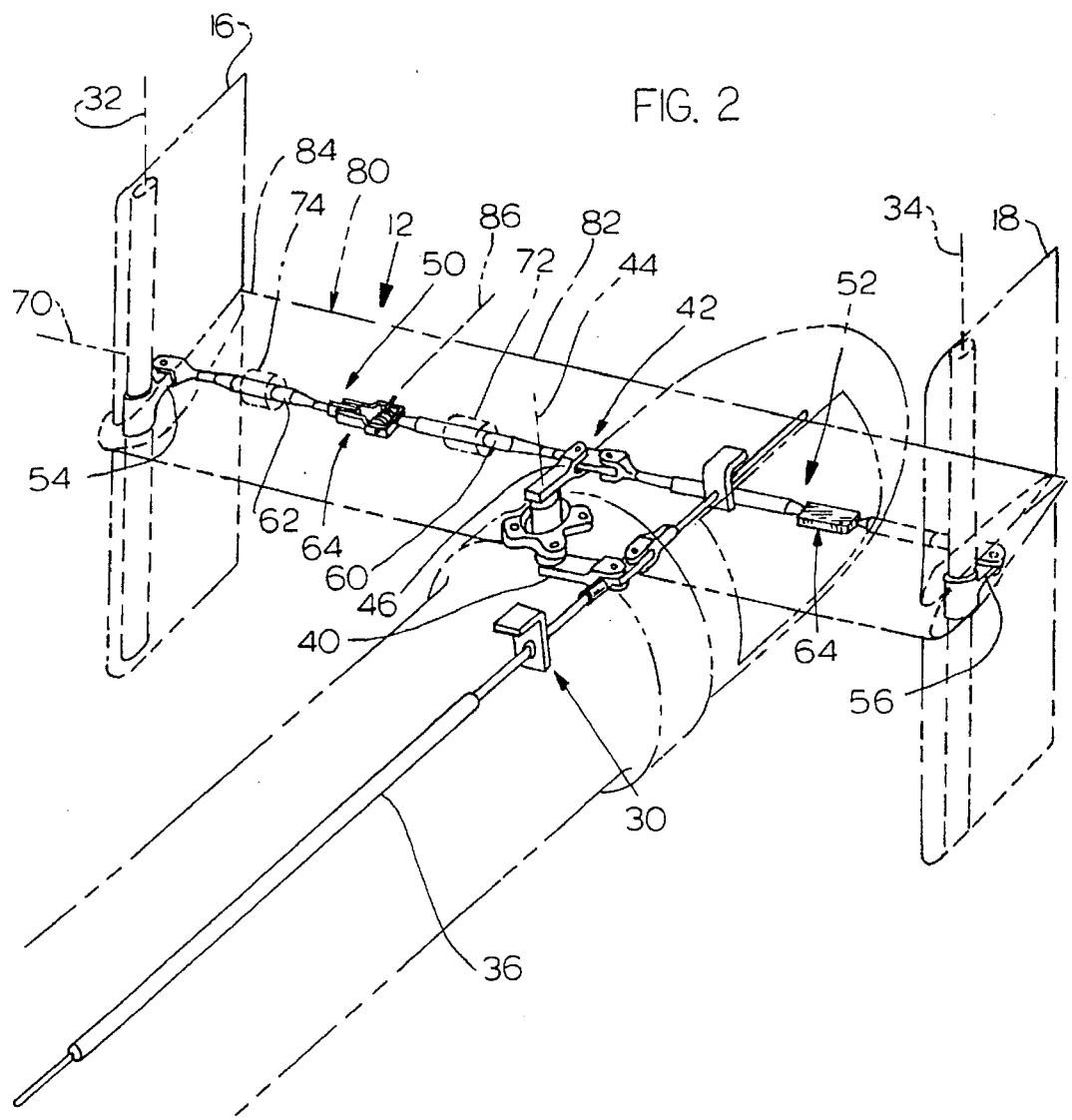
FIG. 2 is an isometric view of the tail boom and horizontal stabilizer of the helicopter of FIG. 1, with the control mechanism shown in solid lines and the airfoil parts shown in phantom lines.

FIG. 2 shows a control mechanism 30 which is used to control pivoting of the fins 16, 18 about fin pivot axes 32, 34. The mechanism includes a main push-pull control 36 which pivots a first lever 40 of a torquing assembly 42. The first lever is pivotally mounted about a torquing axis 44 and causes pivoting of a second lever 46. The second lever moves right and left control rod assemblies 50, 52 which are connected to fin levers 54, 56 that pivot the fins. The two control rod assemblies 50, 52 are substantially identical, and the following description of the right assembly 50 applies equally to the left one.

The control rod assembly 50 includes inboard and outboard control rods 60, 62 and a linkage 64 which connects them. Each of the control rods is guided in linear movements along an axis or force line 70 by a corresponding guide or slider bearing 72, 74.

The horizontal stabilizer 12 includes an airfoil 80 with inboard and outboard airfoil parts 85, 84. The slider bearings 72, 74 that guide the control rods, are fixed in place to corresponding ones of the airfoil parts. The airfoil parts are hinged or pivotally mounted about a main axis 86 which lies above the force line 70 (and extends perpendicular to the force line). The linkage 64 is constructed so when the outer airfoil part 84 pivots up by 90 degrees to the stowed position, the outboard control rod 62 will move with the outboard airfoil part and remain slidably guided within the slider bearing 74. Similarly, when the outer airfoil part 84 is pivoted 90 degrees from the stowed position to the flight position shown in FIG. 2, the linkage permits the outboard control rod 62 to pivot with the outer airfoil part. Such pivoting away from said back towards the flight position, is accomplished without requiring a human operates to move any part of the control mechanism, and regardless of the control rod and fin positions.

Figure 5:
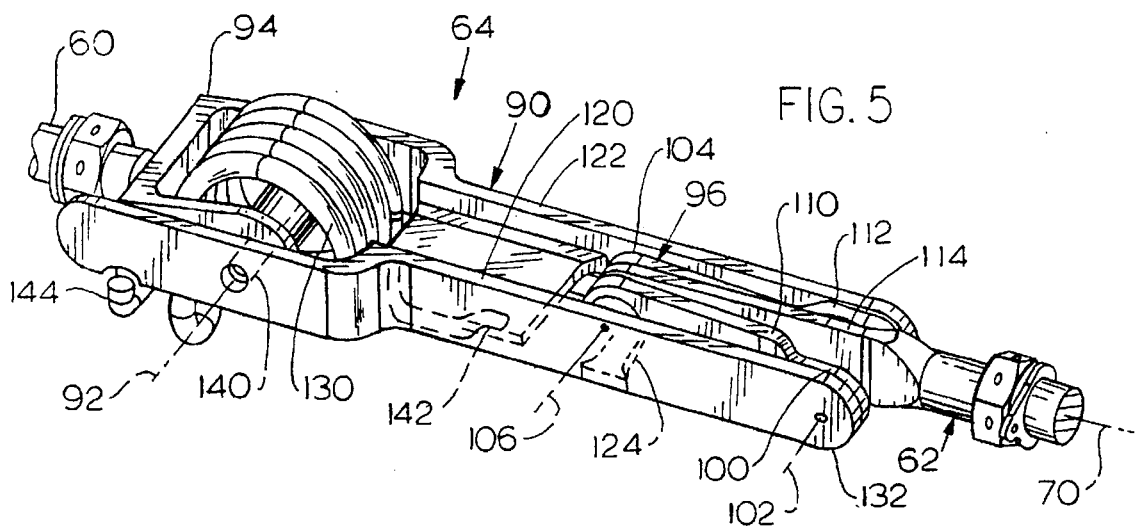
FIG. 5 is an isometric view of the linkage of the control rod assembly of FIG. 2.
Figure 6:
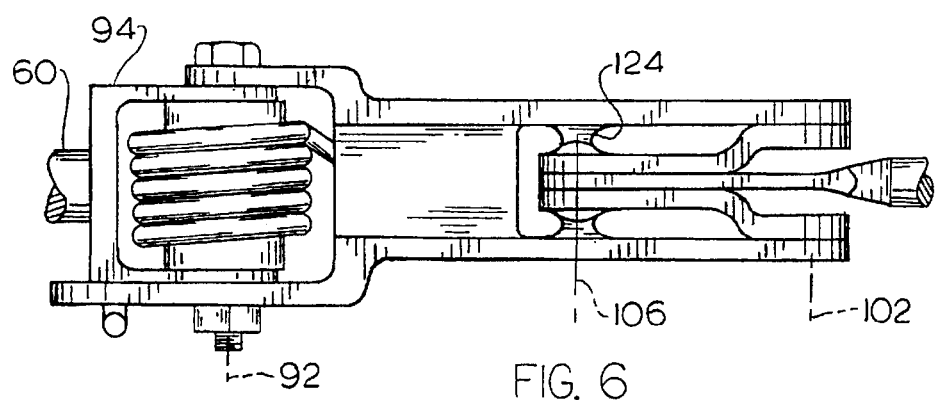
FIG. 6 is a plan view of the linkage of FIG. 5.
Figure 7:
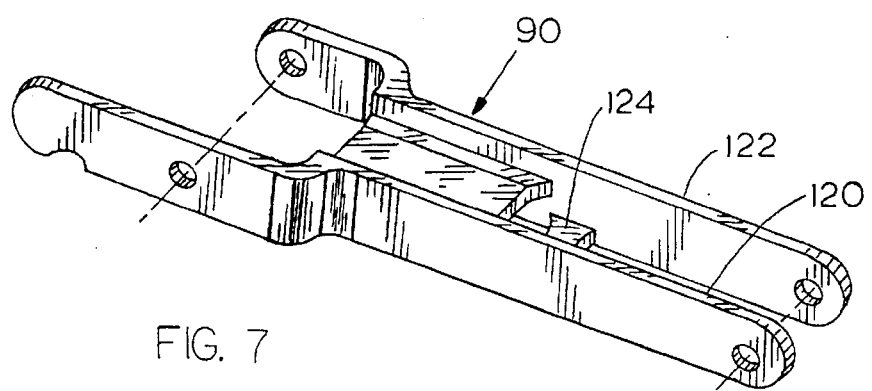
FIG. 7 is an isometric view of the first link of the linkage of FIG. 5.

FIG. 5 shows the linkage 64 which connects the inboard and outboard control rods 60, 62. The linkage includes a long first link 90 that is pivotally mounted about a first axis 92 on the outer end 94 of the inboard control rod 60. The linkage also includes a short or second link 96 which has a first end 100 pivotally mounted about a second axis 102 to an outboard end of the first link. The second link has a second end 104 pivotally connected at a third axis 106 to the inner end of the outboard control rod 62. The second link 96 includes two bars 110, 112 that lie on opposite sides of the inner end 114 of the outboard control rod 62. The bars 110, 112 also is between the bars 120, 122 of the first link. Such bars permit nesting of the second link 96 within the first one 90, and nesting of the inner end 114 of the outboard control rod within the second link, to allow the three pivot axes 92, 102, and 106 to lie substantially on the force line 70 in the flight position. As a result, the links can overlap as seen in a view taken along the axes.

The first link 90 includes 6 stop 124 that prevents the second end 104 of the second link from moving down too far so its second axis 106 would move considerably below the force line 70. The linkage includes a spring 130 which is coupled to the first link 90 to urge its outboard end at 132 end the rods 102 thereat, from moving far below the force line 70 by urging the outboard end 132 upwardly. A spring 130 is used instead of a stop, because the outer end 132 of the first link will move down a small amount during initial movement toward the stowed position, as will be described below. The particular spring 130 is a torsion coil spring which lies around a shaft 140 about which the first link pivots, with one end 142 of the spring pushing up against the first link, and the opposite end 144 of the spring pushing up against the outer end 94 of the inboard control rod 60.

Figure 8:
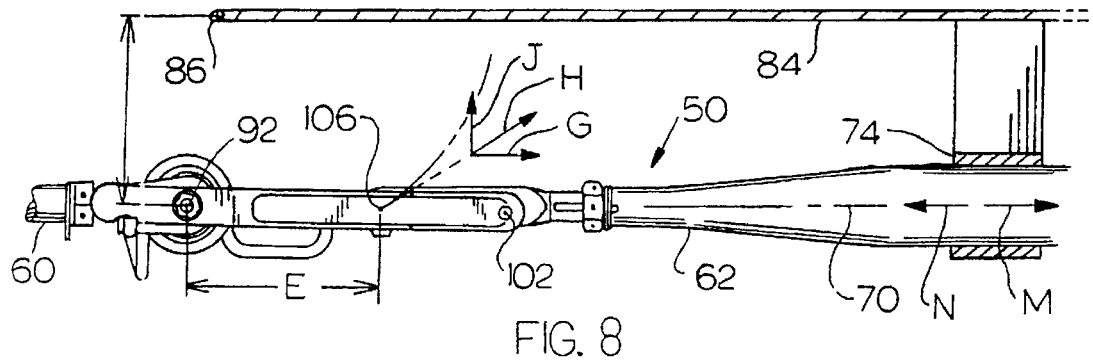
FIG. 8 is a rear elevation view of the control rod assembly of FIG. 5, shown in the flight position.

FIG. 8, shows the control rod assembly 50 in the flight position, wherein the first, second, and third axes 92, 102, 106 all lie substantially on the force line 70. Push and pull control forces M, N can be transmitted along the control rod assembly without pivoting either of the links of the linkage 64 because the axes 92, 102, 106 all lie on or close to the force line 70. If the linkage is adjusted so axes 92, 102, 106 do not all lie on the force line 70, the small loads tending to unfold the linkage under pull force N, are offset by spring 130. Such absence of pivoting avoids "play" or slight movement of one control rod such as 60 with respect to the other 62.

Figure 9:
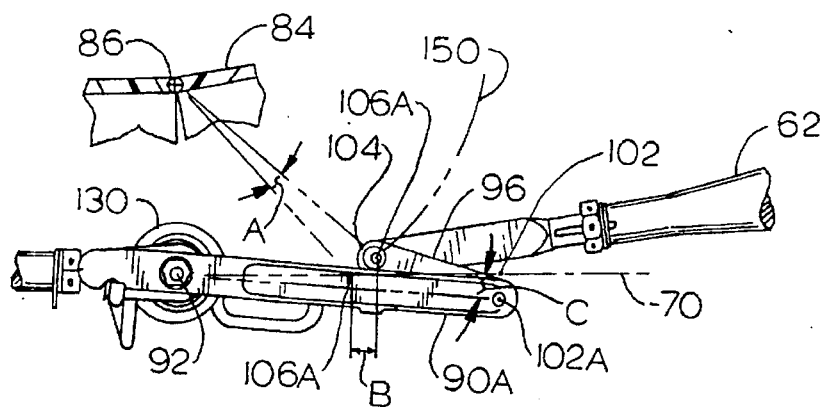
FIG. 9 is a view similar to FIG. 8, but after the outboard airfoil part has pivoted approximately five degrees from the flight position toward the stowed position.

FIG. 9, shows the control rod assembly after the outboard airfoil part at 84A has pivoted by an angle A of about five degrees from the position of FIG. 8, around the main axis 86. During movement of the second link end 104 so its third axis moves from the position 106 to the position 106A, the third axis has moved outboard by a distance B, wherein it tends to move closer to the second axis at 102. As a result, the second ink 96 causes the outer end of the first link at the second axis 102 to move largely downward to the position 102A. The first link pivots down (its outboard end moves down) to the position 90A, wherein it has pivoted by an angle C of about five degrees. The upward force exerted by spring 130 is overcome by the unfolding linkage.

Figure 10:
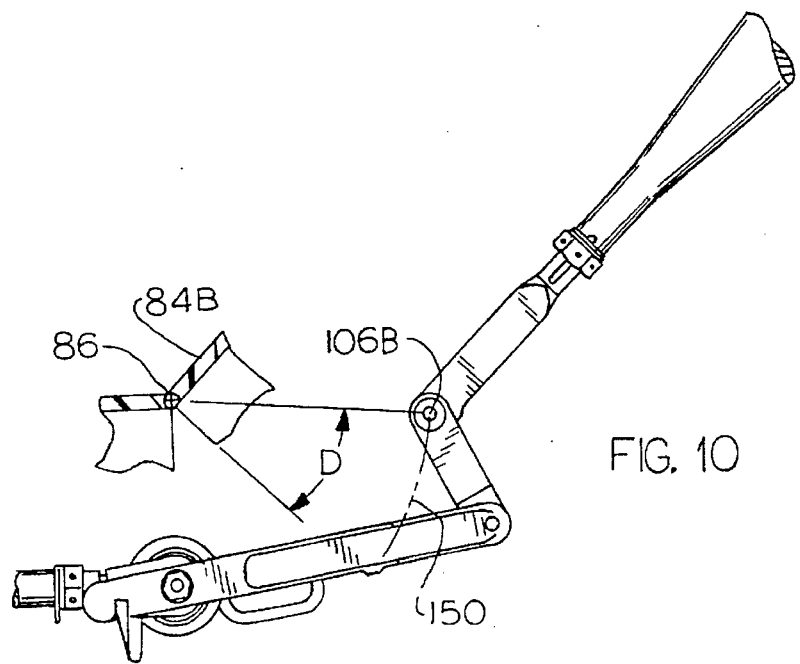
FIG. 10 shows the assembly of FIG. 8 after the outboard airfoil part has pivoted about 45 degrees from the flight position.

FIG. 10, shows the situation where the outboard airfoil part at 84B has pivoted by an angle D of about 45 degrees from its original position in FIG. 8, with the third axis at 106B having moved along the pivot path 150 which is centered on the main axis 86.

Figure 11:
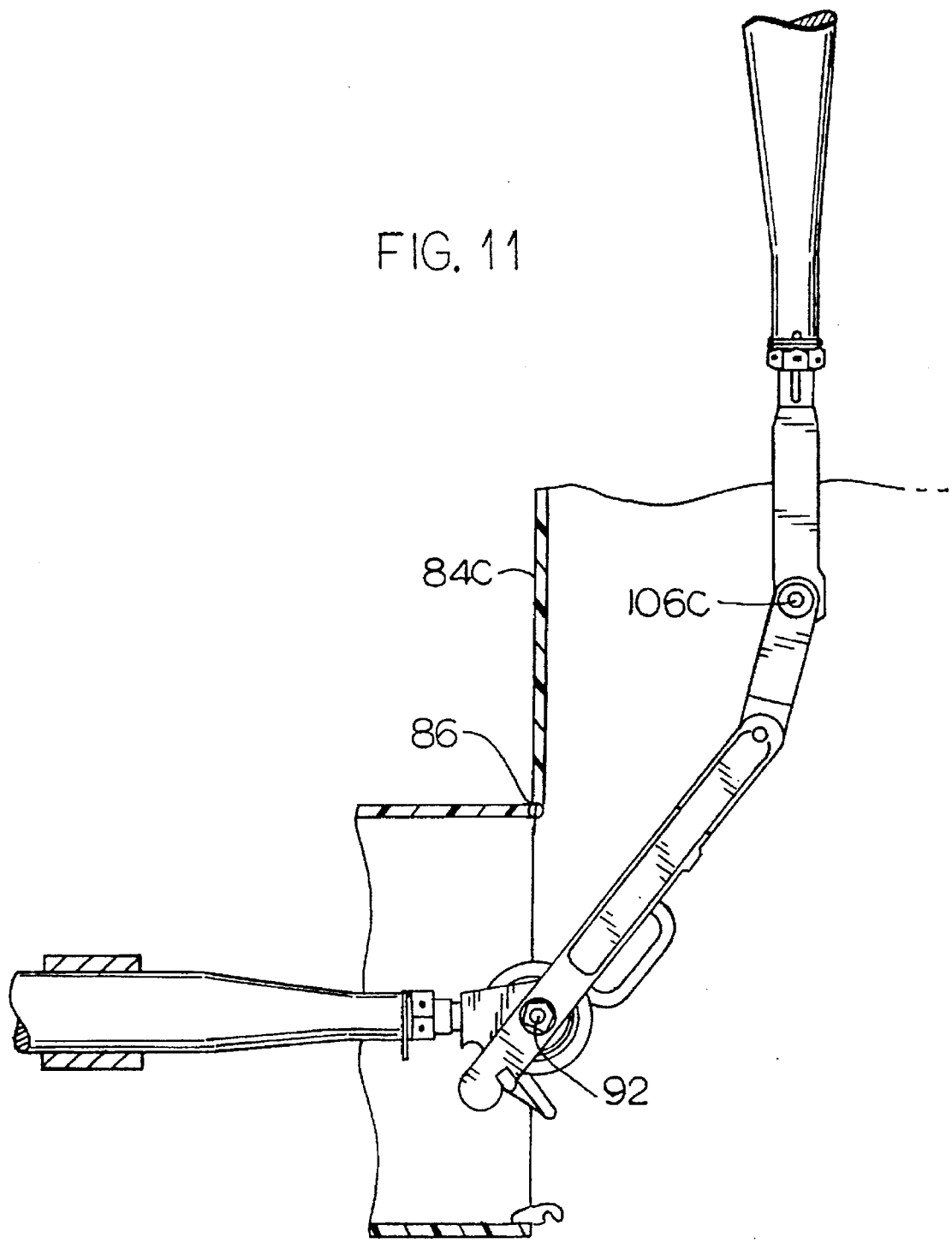
FIG. 11 shows the assembly of FIG. 8 after it has pivoted 90 degrees from the flight position of FIG. 8 and rests in the stowed position.

FIG. 11 shows the control rod assembly in the stowed position, wherein the outboard airfoil part at 84C has pivoted by 90 degrees about the main axis 88. The third axis at 106C has now moved to its fully stowed position.

There is little resistance to most of the pivoting of the links between the flight and stowed positions. However, there is moderate resistance to initial pivoting between the positions of FIGS. 8 and 9, when the rearward directional component G of movement of the outboard control rod inner end along axis 106, must push the first link at second axis 102, largely downwardly. Such resistance to initial movement helps to keep the three axes 92, 102, 106 largely aligned on the force line 70 during normal operation in the flight position.

It may be noted that applicant places the control rod ends, at the axes 92 and 106 in FIG. 8, so only a moderate but not very large force is required to start the pivoting of the outboard control rod 62 towards the stowed position. To this end, the outboard control rod and links are positioned so the third axis at 106 is spaced a distance E from a location directly under the main axis 86, where E is about equal to a distance F between the main axis 86 and the force line 70. Such spacing results in the ends of the control rods at axes 92, 102 being relatively close together. It also results in a substantial upward vertical directional component J of third axis movement H from its initial position, instead of only outboard movement. If the third axis 106 were placed directly under the main axis 86, then the initial direction of movement of the third axis 106 would be almost entirely horizontal and towards the second axis 102, resulting in the need for a very large force to move down the second axis 102 to a position such as shown at 102A in FIG. 9. On the other hand, if the third axis 106 were positioned much further outboard, then the links would have to be longer. Applicant prefers that the distance E be more than one-half of F.

Thus, the invention provides an airfoil assembly such as a horizontal stabilizer, which includes a push-pull control rod which applies force along a force line that is spaced from a main axis about which airfoil parts can pivot. Applicant provides a linkage which connects inboard and outboard control rods. The linkage includes first and second links pivotally connected at three axes to each other and to the control rods, with the axes preferably lying substantially in line and on the force line in the flight position of the assembly. Although applicant shows the main axis of airfoil pivoting as being above the control rod force line, they can be spaced apart in any direction relative to the Earth's gravity for different airfoils.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An aircraft which includes an airfoil having top and bottom parts and at least one fin on said airfoil, and a control rod assembly for transmitting push-pull forces along a force line that lies between said top and bottom parts, to transmit said forces between a control and said fin, wherein:

said airfoil includes inboard and outboard airfoil parts that are pivotally connected about a main pivot axis that is spaced from said force line, to pivot between a flight position wherein said airfoil part extend substantially in line and a stowed position wherein said airfoil parts extend largely 90 degrees to each other;

said control rod assembly includes inboard and outboard control rods having respective outer and inner ends, and a pair of slide bearings that are each mounted on a different one of said airfoil parts and that each supports a corresponding one of said control rods in movement along said force line, in said flight position of said airfoil parts;

a linkage which connects said outer end of said outboard control rod to said inner end of said outboard control rod and which transmits push-pull forces along said force line in said flight position;

said linkage comprises a first link pivotally connected about a first axis to the outer end of said inboard control rod, a second link having first and second ends respectively pivotally connected to said first link at a second axis, and to said inner end of said outboard control rod at a third axis, said first and second and third axes extending substantially parallel to said main pivot axis and lying substantially on said force line in said flight position.

2. The aircraft described in claim 1 wherein:

said first link is longer than said second link, and said first and second links are constructed to substantially overlap as seen in a view along said axes in said flight position, with said third axis lying substantially between said first and second axes in said flight position.

3. The aircraft described in claim 2 wherein:

said second axis lies outboard of said first axis; and including a spring coupled to said inner end of said inboard control rod and to said first link and urging said first link to pivot in a direction to raise said second axis.

4. The aircraft described in claim 2 wherein:

said first link has an upwardly-facing stop that is positioned to engage said second end of said second link, to limit downward movement of said second end of said second link with respect to said first link.

5. The aircraft described in claim 1 wherein:

said third axis at said inner end of said outboard control rod lies outboard of and below said main axis, so said third axis initially moves with an outboard directional component as said outboard airfoil part moves away from said flight position toward said stowed position;

said first link is free to pivot down a plurality of degrees from a position it assumes in said flight position, so said second axis can move primarily downward as the end of said second link of said third axis shifts largely in an outboard direction when said outboard airfoil part moves away from said flight position toward said stowed position.

6. An airfoil apparatus which includes an airfoil having inboard and outboard airfoil parts, and which also includes a control rod assembly having inboard and outboard control rods and guides that guide said control rods in movement largely along a force line lying within said airfoil, wherein:

said airfoil parts are pivotally connected about a main axis that is spaced from said force line, so said airfoil parts can pivot between flight and stowed positions;

said inboard control rod has an outboard end and said outboard control rod has an inboard end, and said control rod assembly includes a linkage which connects said inboard and outboard ends, said linkage including first and second links with said first link having a first end pivotally connected to said outer end of said inboard control rod about a first axis, said first link having a second end, said second link having a first end pivotally connected to said second end of said first ink at a second axis, and said second link having a second end pivotally connected to said outboard control rod inner end about a third axis, with said third axis lying between said first and third axes.

7. The airfoil apparatus described in claim 6 wherein:

said third axis is spaced outboard from said main axis by at least one-half of the distance between said main axis and said force line, whereby to cause said third axis to move with a substantial directional component away from said force line during early pivoting from said flight position.

8. A method for storing an aircraft airfoil assembly that comprises an airfoil that includes inboard and outboard airfoil parts having upper and lower walls, wherein said inboard airfoil part is mounted on a frame of an aircraft and said outboard airfoil part pivotally supports a fin, and wherein said airfoil assembly includes a push-pull control rod assembly having an inboard end connected to a control and an outboard end connected to said fin, with said control rod assembly lying between said upper and lower walls, comprising:

pivotally connecting said inboard and outboard airfoil parts about a main axis lying substantially at laid upper wall and at a middle location along the length of said airfoil assembly;

forming said control rod assembly with inboard and outboard control rods having adjacent ends and with first and second links connecting said adjacent ends, wherein said first link has an inboard end connected to said inboard control rod about a first axis and has an outboard end connected to said second link about a second axis, and said second link has a second and connected to said outboard control rod;

pivoting said outboard airfoil part from a primarily horizontal flight orientation in line with said inboard airfoil part, by about 90 degrees while also pivoting said outer control rod, both about said main axis, while initially moving down said second axis and then moving up said second axis.

* * * * *